March 11, 1930.  F. R. CANNEY  1,750,089
SURFACE CONTROL MECHANISM FOR AIRPLANES
Filed March 26, 1928   2 Sheets-Sheet 1
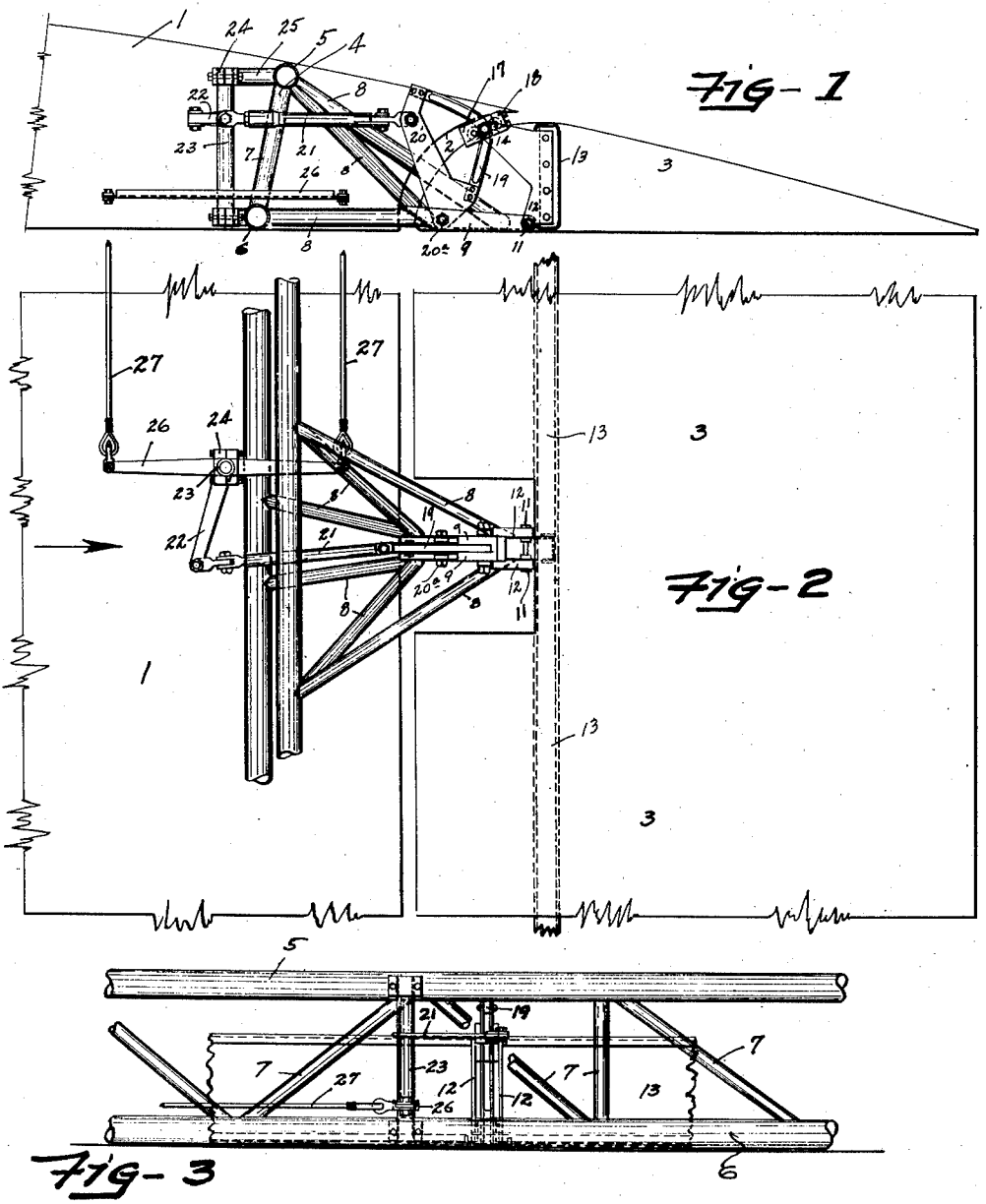
INVENTOR
Frank R. Canney March 11, 1930. F. R. CANNEY 1,750,089
SURFACE CONTROL MECHANISM FOR AIRPLANES
Filed March 26, 1928 2 Sheets-Sheet 2
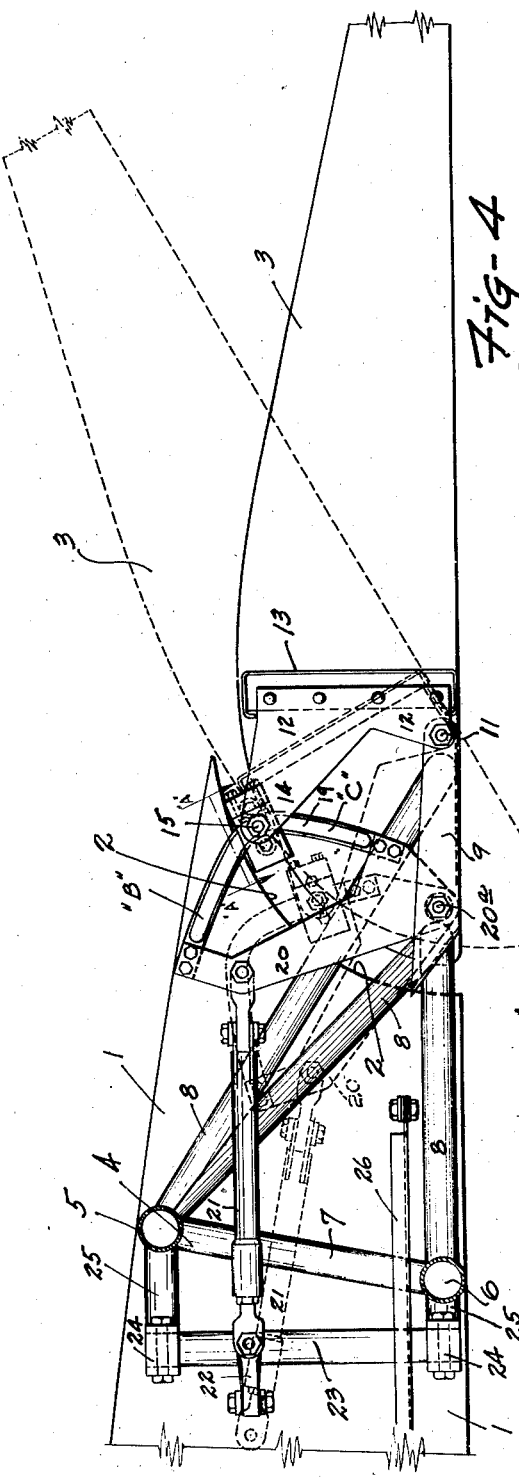
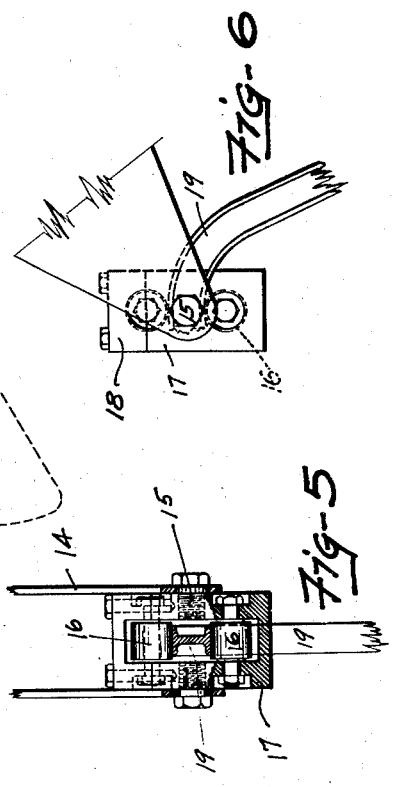
INVENTOR
Frank R. Canney Patented Mar. 11, 1930

1,750,089

UNITED STATES PATENT OFFICE

FRANK R. CANNEY, OF SEATTLE, WASHINGTON, ASSIGNOR TO BOEING AIRPLANE COMPANY, OF SEATTLE, WASHINGTON

SURFACE-CONTROL MECHANISM FOR AIRPLANES

Application filed March 26, 1928. Serial No. 264,894.

This invention is directed to control surfaces for airplanes and more especially to means for operating said surfaces either in an equal or differentiating manner, for example, in operating two oppositely disposed aileron members, it is desiderate to move one aileron in an upward direction a greater distance than the opposite aileron which will be simultaneously moved downwardly but at a lesser angle of attack. This is particularly advantageous in controlling the airplane at slow speeds. In flight the drag forces created by a downwardly positioned aileron are greater than the upwardly positioned aileron and it is obvious that at slow speeds the purpose of the aileron is defeated by reason of the down aileron and its drag forces being on the outside of the turn. The advantages of ailerons being interconnected in a differential manner as outlined, are obvious, and I am aware of some differential control systems, but all of them to my knowledge embody a mechanism whereby the differential action is limited to a given range, and which action is only effective at the maximum of aileron movement, for instance; both ailerons will start in neutral and while operating near the neutral point their relation will have very little differentiation, but with my improved form of adjustable means for providing a variable ratio from the zero point in both directions, the variable ratio becomes effective simultaneously with the manipulation of the ailerons. Accordingly therefore the principal object of my invention is to provide a new, novel, and selective cam actuated mechanism whereby the ratio of the angular movement of one aileron to its companion aileron will progressively change as the angle of attack increases from the neutral, or starting point. A still further adjustment may be made by the use of my improved form of cam mechanism whereby the ratio between the ailerons will be equal for a given distance through the lesser angles of attack and after passing that point will increase or decrease relatively in progressing through the greater angles of attack in accordance with the shape and contour of a previously selected and installed cam, for a predetermined ratio of aileron action.

The adjustable cam mechanism provides a still further object of the invention in that it will absorb operative loads as well as vibrational stresses which occur in flight and which would be otherwise transmitted through the control cables to the operating stick in the fuselage.

These and other objects will appear as my invention is more fully hereinafter described in the following specification, illustrated in the accompanying drawings and finally pointed out in the appended claims.

In the drawings

Figure 1, is a sectional end elevation of a fragment of a wing member showing my improved type of aileron and controlling mechanism in operative engagement therewith.

Fig. 2, is a plan view of Figure 1.

Fig. 3, is a view looking in the direction of the arrow in Figure 2.

Fig. 4, is an enlarged view of Figure 1.

Fig. 5, is an enlarged detailed sectional view, taken on the line "A"—"A" of Figure 4.

Fig. 6, is a side elevation of, and projected from Figure 5.

Referring now more particuarly to the drawings:

Reference numeral 1 indicates a fragment of an airplane wing, recessed, as at 2, along a portion of its trailing edge, as shown, to receive an aileron 3 which is pivotally mounted with respect to the wing for a swinging movement either upwardly or downwardly. The wing beams or spars, generally indicated at 4, are built up of longitudinal and parallel tubular members 5 and 6, spaced apart and braced by vertically and diagonally disposed tubular members 7. Extending rearwardly from the wing beam just described are a plurality of supporting tubular members 8, carrying a bracket 9, to the rear end of which the aileron is pivoted by means of a bolt 11 or the like. The bolt passes through a pair of plates 12 carried by the aileron beam or spar 13. The upper portion of the plates 12 are formed into arms 14 which pivotally embrace, as at 15, a cam engaging means which consists of a pair of rollers 16 rotatably mounted in a block 17 formed with a cap 18 for convenience in assembling onto a cam 19. Upon removing the cap 18 the upper roller may be removed, leaving the block 17, which is of bifurcated formation, free to straddle the cam from the under side and then to receive the upper roller followed by the cap 18. The cam 19 is removably secured to a bell crank 20. The lower end of the bell crank is pivotally mounted to the forward end of the bracket 9 as indicated at 20^A. While I have shown a cam of a particular shape, it is to be understood that cams of various shapes may be employed. The present cam shown in Figures 1 and 4 has what might be called a two to one ratio, that is the left hand portion of the cam as viewed in Figure 4 and indicated by the letter "B," is of lesser angularity than the right hand or lower portion indicated at "C" which is substantially vertical when the aileron is in a neutral position. 21 indicates an adjustable link, one end of which is secured to the bell crank 20, and its opposite end is connected with an arm 22 which is mounted to a vertical shaft 23. The shaft is pivotally mounted in brackets 24 carried by tubular arms 25 extending outwardly from the wing beam 5. Near the lower end of the shaft 23 is a cross arm 26 from which control cables 27 extend in any approved manner to the controls in the cockpit. As the control cables are operated and the shaft 23 is pivoted the link 21 will of course draw the bell crank 20 forwardly or move it rearwardly which will cause a resultant upward or downward movement of the ailerons. When the cam is moved rearwardly the rollers of course will travel over the portion of the cam marked "B" and due to the slight angularity of that portion, the downward movement of the aileron will be considerably less than the upward movement of the same aileron would be. In the forward travel of the cam, the rollers will travel over that portion marked "C" and due to the greater angularity of that portion with respect to the "B" portion, the aileron will naturally be swung upwardly to a greater angle of attack by assuming the position shown in dotted lines in Figure 4. While I have shown but one aileron and one controlling mechanism it is to be understood that this system is applicable to a plurality of interconnected ailerons and that each aileron may be provided with one or more of the cam mechanisms and controls therefor. Furthermore while I have shown and described but one aileron and its operation, it is to be understood that the operation of the opposite or companion aileron or ailerons, is opposite, and that the interconnection is such that the upturned aileron is simultaneously given a greater degree of movement than the downturned aileron on the opposite side of the machine.

While I have shown a particular form of embodiment of my invention, I am aware that many minor changes therein will readily suggest themselves to others skilled in the art without departing from the spirit and scope of my invention.

Having thus described my invention; what I claim as new and desire to protect by Letters Patent is:—

1. In a system for lateral control for aircraft, the combination of a pair of aerodynamically differential ailerons having normally equal and substantial angles of incidence, actuating means interconnecting said ailerons, cam members interposed between said actuating means and said ailerons, means povitally mounted on said ailerons for engagement with said cam members.

2. In a system for lateral control for aircraft, the combination of a pair of aerodynamically differential ailerons having normally equal and substantial angles of incidence, actuating means interconnecting said ailerons through adjustable cam members which are movable independently of the ailerons, means pivotally mounted on said ailerons for rolling engagement with said cam members.

In testimony whereof I affix my signature.

FRANK R. CANNEY.